United States Patent
Maruyama (10) Patent No.: US 8,282,154 B2
(45) Date of Patent: Oct. 9, 2012

(54) VEHICLE BODY LATERAL SIDE PORTION STRUCTURE

(75) Inventor: Kazuhiko Maruyama, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 186 days.

(21) Appl. No.: 12/746,278

(22) PCT Filed: Dec. 4, 2008

(86) PCT No.: PCT/JP2008/072078
§ 371 (c)(1),
(2), (4) Date: Jun. 4, 2010

(87) PCT Pub. No.: WO2009/078288
PCT Pub. Date: Jun. 25, 2009

(65) Prior Publication Data
US 2010/0270830 A1   Oct. 28, 2010

(30) Foreign Application Priority Data

Dec. 19, 2007  (JP) ................... 2007-327232
Dec. 21, 2007  (JP) ................... 2007-331009

(51) Int. Cl.
*B60J 7/00*   (2006.01)
(52) U.S. Cl. ............................................... 296/193.05
(58) Field of Classification Search ............. 296/193.05, 296/146.9, 187.12, 203.01, 203.03, 209, 296/146.6; 105/420, 418, 248, 251, 406.1, 105/409, 228
See application file for complete search history.

(56) References Cited

U.S. PATENT DOCUMENTS

| 3,132,891 | A | * | 5/1964 | Pyuro et al. | 296/204 |
| 4,462,633 | A | * | 7/1984 | Maeda | 296/187.12 |
| 4,911,495 | A | * | 3/1990 | Haga et al. | 296/209 |
| 5,267,772 | A | * | 12/1993 | Ohta et al. | 296/187.11 |

(Continued)

FOREIGN PATENT DOCUMENTS

JP   54-135413   9/1979
(Continued)

OTHER PUBLICATIONS

Japanese Office Action mailed Feb. 21, 2012, Application No. 2007-331009, four pages.

(Continued)

*Primary Examiner* — Kiran B Patel
(74) *Attorney, Agent, or Firm* — Rankin, Hill & Clark LLP (57) ABSTRACT

A vehicle body lateral side portion structure including a side sill which has a closed cross-sectional structure formed from an inner panel and an outer panel, and is arranged along the vehicle longitudinal direction, wherein: an outer side wall of the outer panel includes a plurality of step portions; an arch surface which protrudes towards a vehicle exterior side taking, as an apex point, a vicinity of a join position with a center pillar of the vehicle body is formed in a portion of the outer side wall; the outer panel includes a planar portion adjoining the arch surface and a rectilinear portion extending in the vehicle longitudinal direction; a distal end portion of the side sill is connected to a front side frame of the vehicle body; and a rear end portion of the side sill is connected to a rear frame portion of the vehicle body.

7 Claims, 9 Drawing Sheets

U.S. PATENT DOCUMENTS

| | | | | |
|---|---|---|---|---|
| 5,354,115 A | * | 10/1994 | Esaki | 296/203.03 |
| 5,443,297 A | * | 8/1995 | Tanaka et al. | 296/203.03 |
| 5,782,525 A | * | 7/1998 | Honma et al. | 296/187.12 |
| 5,924,765 A | * | 7/1999 | Lee | 296/209 |
| 5,938,275 A | * | 8/1999 | Kleinhans et al. | 296/203.03 |
| 5,941,597 A | * | 8/1999 | Horiuchi et al. | 296/203.01 |
| 5,954,390 A | * | 9/1999 | Kleinhoffer et al. | 296/203.01 |
| 6,042,176 A | * | 3/2000 | Ikeda et al. | 296/187.05 |
| 6,254,172 B1 | * | 7/2001 | Takahara | 296/187.05 |
| 6,354,656 B1 | * | 3/2002 | Hwang | 296/209 |
| 6,390,539 B2 | * | 5/2002 | Takahara | 296/187.05 |
| 6,409,257 B1 | * | 6/2002 | Takashina et al. | 296/209 |
| 6,554,350 B2 | * | 4/2003 | Takahara | 296/187.05 |
| 6,619,729 B2 | * | 9/2003 | Kimura et al. | 296/203.03 |
| 6,679,546 B2 | * | 1/2004 | Mishima et al. | 296/203.01 |
| 6,692,065 B2 | * | 2/2004 | Yamamoto et al. | 296/205 |
| 6,854,795 B2 | * | 2/2005 | Yamazaki et al. | 296/209 |
| 6,910,732 B2 | * | 6/2005 | Miyoshi et al. | 296/203.03 |
| 7,032,959 B2 | * | 4/2006 | Berstecher et al. | 296/193.05 |
| 7,104,596 B2 | * | 9/2006 | Goto et al. | 296/193.07 |
| 7,168,757 B2 | * | 1/2007 | Futatsuhashi | 296/209 |
| 7,237,832 B2 | * | 7/2007 | Saeki | 296/209 |
| 7,264,302 B2 | * | 9/2007 | Nagashima | 296/187.12 |
| 7,520,557 B2 | * | 4/2009 | Yoshida et al. | 296/155 |
| 7,527,315 B2 | * | 5/2009 | Sumida et al. | 296/69 |
| 7,581,782 B2 | * | 9/2009 | Tomozawa | 296/187.12 |
| 7,614,683 B2 | * | 11/2009 | Roccato et al. | 296/187.03 |
| 7,887,123 B2 | * | 2/2011 | Honji et al. | 296/187.09 |
| 7,914,068 B2 | * | 3/2011 | Mizohata | 296/193.06 |
| 7,976,098 B2 | * | 7/2011 | Nishimura et al. | 296/193.06 |
| 8,002,339 B2 | * | 8/2011 | Rill et al. | 296/209 |
| 8,007,038 B2 | * | 8/2011 | Stoeckl | 296/209 |
| 8,011,721 B2 | * | 9/2011 | Yamada et al. | 296/209 |
| 8,070,215 B2 | * | 12/2011 | Yoshioka et al. | 296/187.12 |
| 8,118,355 B2 | * | 2/2012 | Tamura et al. | 296/209 |
| 8,128,154 B2 | * | 3/2012 | Egawa et al. | 296/187.12 |
| 8,132,852 B2 | * | 3/2012 | Yamaki | 296/187.08 |
| 2001/0005092 A1 | * | 6/2001 | Sakyo et al. | 296/190.08 |
| 2002/0043821 A1 | | 4/2002 | Takashina et al. | |
| 2005/0189790 A1 | * | 9/2005 | Chernoff et al. | 296/193.05 |
| 2007/0187995 A1 | * | 8/2007 | Mouch et al. | 296/209 |
| 2009/0102233 A1 | * | 4/2009 | Tomozawa | 296/187.02 |
| 2009/0115207 A1 | * | 5/2009 | Lassl et al. | 293/120 |
| 2010/0013268 A1 | * | 1/2010 | Roccato et al. | 296/187.08 |
| 2010/0207426 A1 | * | 8/2010 | Tsuruta et al. | 296/187.12 |
| 2010/0207428 A1 | * | 8/2010 | Fukushima | 296/203.03 |
| 2010/0237659 A1 | * | 9/2010 | Ishigame et al. | 296/204 |
| 2011/0095567 A1 | * | 4/2011 | Ishigame et al. | 296/187.03 |
| 2011/0099912 A1 | * | 5/2011 | Ohtake et al. | 49/502 |
| 2011/0175399 A1 | * | 7/2011 | Nakano | 296/193.05 |
| 2011/0233970 A1 | * | 9/2011 | Nagai et al. | 296/203.03 |
| 2011/0285175 A1 | * | 11/2011 | Imamura | 296/193.05 |
| 2011/0298267 A1 | * | 12/2011 | Yamaki et al. | 297/391 |
| 2012/0013108 A1 | * | 1/2012 | Yamaki et al. | 280/730.2 |

FOREIGN PATENT DOCUMENTS

| | | |
|---|---|---|
| JP | 60-201929 | 10/1985 |
| JP | 05-020983 U | 3/1993 |
| JP | 06-166383 | 6/1994 |
| JP | 06-211164 | 8/1994 |
| JP | 08-192767 | 7/1996 |

OTHER PUBLICATIONS

Japanese Office Action mailed Feb. 21, 2012, Application No. 2007-327232, four pages.

* cited by examiner

VEHICLE BODY LATERAL SIDE PORTION STRUCTURE

TECHNICAL FIELD

The present invention relates to a vehicle body lateral side portion of a vehicle, and particularly to a vehicle body lateral side portion structure surrounding a side sill.

Priority is claimed on Japanese Patent Application No. 2007-327232, filed Dec. 19, 2007, and on Japanese Patent Application No. 2007-331009, filed Dec. 21, 2007, the contents of which are incorporated herein by reference.

BACKGROUND ART OF THE INVENTION

A side sill which is provided in a vehicle body lateral side portion functions as a structural component in the longitudinal direction of the vehicle. When the front surface of a vehicle is in a collision, the side sill receives in a favorable buckling direction strength-wise a portion of the load which is applied from the front, and provides resistance to the collision. Accordingly, normally, a side sill has a closed cross-sectional structure extending in the longitudinal direction of the vehicle, in which an outer side panel and an inner side panel are bonded together via flanges which are provided on top and bottom edges thereof, and which provides excellent strength and rigidity. However, in recent years, even greater improvements in safety have been demanded during a side-on vehicle collision, and the demands have included making improvements to strength and rigidity during a collision from the side surface of a side sill.

For example, one technology employs a structure in which a rocker reinforcement is formed in an arch shape and which provides reinforcement against vehicle side surface collisions (see Patent document 1).

Patent document 1: Japanese Patent Publication No. 2990983

DETAILED DESCRIPTION OF THE INVENTION

Problems to be Solved by the Invention

However, in the above described conventional technology, the entire rocker reinforcement is formed in an arch shape. Because of this, for example, in what is known as an offset collision which is a front-on collision in which the vehicle body centers are mutually offset from each other, the problem arises that if a load in the longitudinal direction becomes concentrated on one of the rocker reinforcements, then it is easy for bending to occur in the arch-shaped rocker reinforcement.

In response to this, measures such as providing separate reinforcing components, or increasing the plate thickness of the rocker reinforcement may be considered, however, the vehicle body weight would then increase by an equivalent amount, so that the end result would be a backward step in fuel consumption improvement.

It is therefore an object of the present invention to provide a vehicle body lateral side portion structure which does not require any component other than a side sill, and which is able to receive an impact load at the time of both a vehicle front-on collision and a vehicle side-on collision over an entire vehicle body without this leading to any increase in the vehicle weight.

Means for Solving the Problem

In order to achieve the above described object, the present invention employs a vehicle body lateral side portion structure including a side sill which has a closed cross-sectional structure formed by joining together an inner panel on a vehicle compartment interior side and an outer panel on a vehicle compartment exterior side and which is arranged, as a vehicle body frame component, on the vehicle body lateral side portion along the vehicle longitudinal direction, wherein: an outer side wall of the outer panel includes a plurality of step portions; an arch surface which protrudes towards the vehicle compartment exterior side taking, as an apex point, a vicinity of a join position with a center pillar of the vehicle body is formed in a portion of the outer side wall of the outer panel; the outer panel is provided with a planar portion which adjoins the arch surface, and which includes a rectilinear portion extending in the vehicle longitudinal direction; a distal end portion of the side sill is connected to a front side frame of the vehicle body; and a rear end portion of the side sill is connected to a rear frame portion of the vehicle body.

According to the above described vehicle body lateral side portion structure, the rectilinear portion which is aligned in the vehicle longitudinal direction is able to provide resistance to a load which is applied from the front during a front-on vehicle collision while receiving the load in the buckling direction thereof. On the other hand, a load which is applied from the side during a side-on vehicle collision is effectively transmitted to the front end side and the rear end side of the side sill by the outer side wall of the arch-shaped outer panel which bulges towards the exterior side of the vehicle compartment, so that the load is received by the entire side sill. As a result, it is possible to prevent bending deformation.

It may be arranged such that the inner panel is a side sill inner; and the outer panel is a side sill reinforcement.

In this case, it is possible to demonstrate the functions of the side sill to the maximum by effectively utilizing components for reinforcing the side sill.

It may be arranged such that the vehicle body lateral side portion structure further includes a side sill outer which is joined to the side sill inner and the side sill reinforcement and which is provided on an outer side of the side sill reinforcement so as to cover the side sill reinforcement, wherein the side sill outer is provided with an arch portion and a flat portion which conform respectively to the curved surface portion and the planar portion of the side sill reinforcement.

In this case, since a step portion is formed by the arch portion and the flat portion of the side sill outer at the front end portion and the rear end portion of the side sill, it is possible to secure excellent legroom when a vehicle occupant is getting into or out of a vehicle.

It may be arranged such that a center portion of the planar portion of the side sill is formed in an arch shape which bulges upwards.

In this case, it is possible to suppress any upward protrusion on the front end portion side and the rear end portion side of the side sill.

It may be arranged such that the arch surface is formed in a center portion of the outer side wall of the outer panel; and the planar portion is formed adjacent to the top of the arch surface.

It may be arranged such that the arch surface is formed in a top portion of the outer side wall of the outer panel; and the planar portion is formed below the arch surface.

In this case, the planar portion is able to provide resistance to a load which is applied from the front during a front-on vehicle collision while receiving the load in the buckling direction thereof. On the other hand, a load which is applied from the side during a side-on vehicle collision is effectively transmitted to the front end side and the rear end side by the arch-shaped arch surface, so that this load is received by the entire side sill. As a result, it is possible to prevent bending deformation.

ADVANTAGEOUS EFFECTS OF THE INVENTION

According to the present invention, a rectilinear portion which is aligned in the vehicle longitudinal direction is able to provide resistance to a load which is applied from the front during a front-on vehicle collision while receiving in the buckling direction thereof. On the other hand, a load which is applied from the side during a side-on vehicle collision is effectively transmitted to a front end side and a rear end side of a side sill by an outer side wall of an arch-shaped outer panel which bulges towards the exterior side of a vehicle compartment, so that this load is received by the entire side sill and bending deformation can be prevented. As a result, without requiring a separate component, and without increase in the vehicle body weight, it is possible for the side sill to be made to function effectively as a framework component.

Moreover, since it is possible to demonstrate the functions of the side sill to the maximum by effectively utilizing components to reinforce the side sill, compared with when a separate component is used, it is possible to reduce the vehicle weight, which, as a result, is able to contribute to an improvement in fuel consumption.

Moreover, since any upward protrusion on the front end portion side and the rear end portion side of the side sill can be suppressed, it is possible to improve the ease of vehicle entry and exit of occupants to both front seats and rear seats.

Furthermore, since a step portion is formed by an arch portion and a flat portion of a side sill outer at a front end portion and a rear end portion of a side sill, it is possible to secure excellent legroom when a vehicle occupant is getting into or out of a vehicle. Because of this, rear seat occupants and front seat occupants are able to get into or out of a vehicle easily, resulting in improved ease of vehicle entering and exiting.

DESCRIPTION OF THE REFERENCE SYMBOLS

1 Vehicle body
10 Front side frame
20 Rear frame portion (Rear floor frame)
30 Side sill inner (Inner panel)
31 Side sill reinforcement (Outer panel)
40 First curved surface portion (Outer wall)
49 Second curved surface portion (Top wall portion)
R2 Second ridge line (Rectilinear portion)
R3 Third ridge line (Rectilinear portion)
R4 Fourth ridge line (Rectilinear portion)
S Side sill
201 Vehicle body
221 Center pillar stiffener (Center pillar)
230 Side sill inner (Inner panel)
231 Side sill reinforcement (Outer panel)
240 Curved surface portion
241 Planar portion
250 Side sill outer
259 Arch portion
260 Flat portion
2S Side sill
2P Apex point

BEST MODE FOR CARRYING OUT THE INVENTION

A first embodiment of the present invention will now be described with reference to the drawings.

Figure 1:
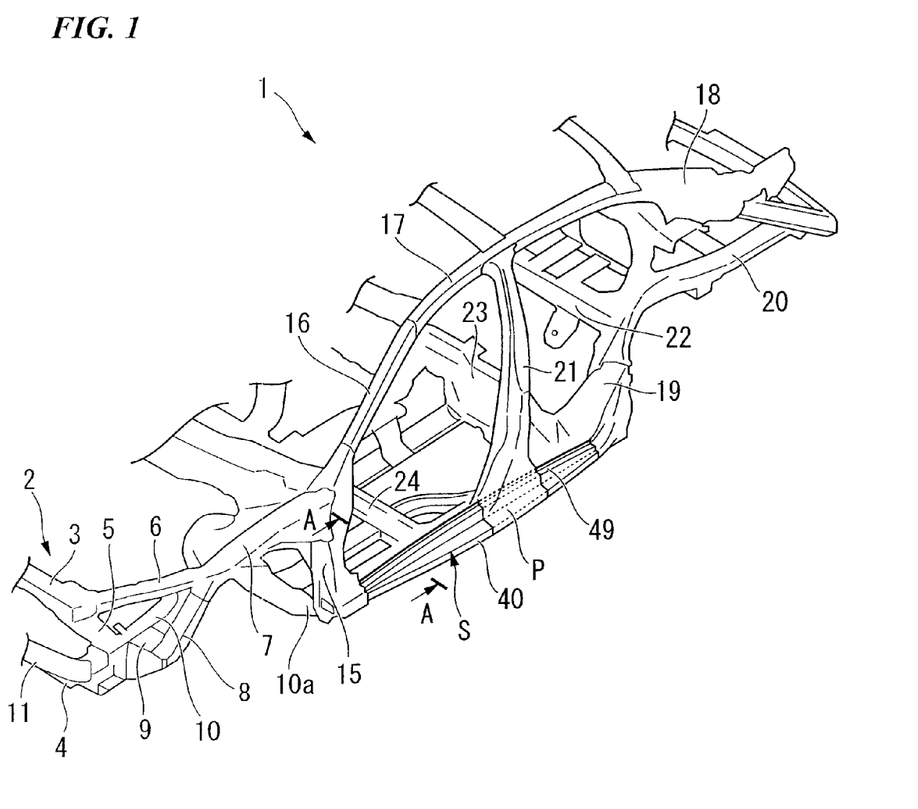
FIG. 1 is a perspective view showing a left side of a vehicle body according to a first embodiment of the present invention.
Figure 2:
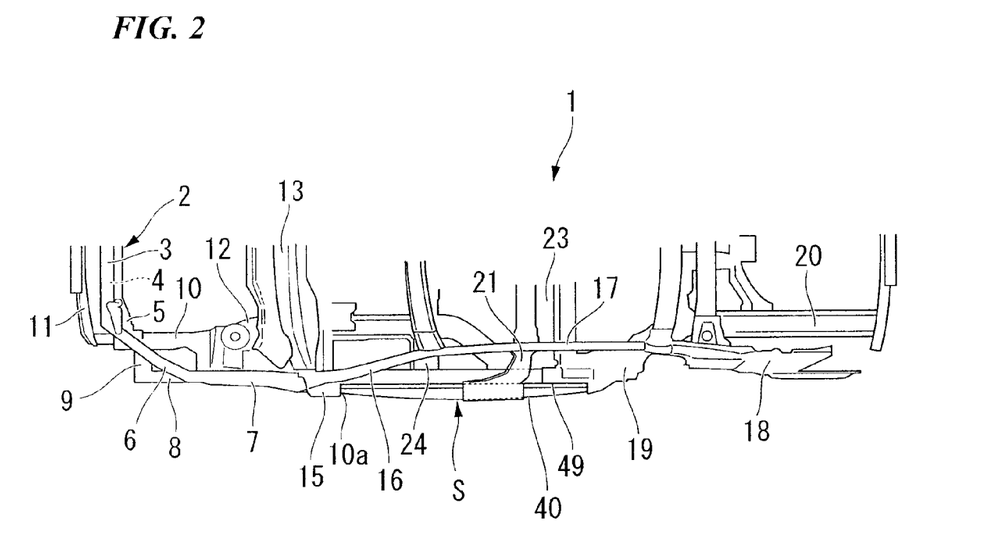
FIG. 2 is a plan view of FIG. 1.

FIG. 1 is a perspective view showing a left side of a vehicle body 1, while FIG. 2 is a plan view thereof.

In FIGS. 1 and 2, a frame-shaped front bulkhead 2 which protects a radiator (not shown) is provided in a vehicle body front portion. The front bulkhead 2 is formed by joining together a bulkhead upper center frame 3 which makes up a top side of the front bulkhead 2, a bulkhead lower cross member 4 which makes up a bottom side of the front bulkhead 2 and whose two end portions extend upwards, and bulkhead side stays 5 and 5.

A front end portion of a bulkhead upper side frame 6 is connected to both end portions of the bulkhead upper center frame 3, and a rear end portion of the bulkhead upper side frame 6 is connected to a wheel house upper member 7. A rear end portion of a front wheel house lower member 8 is connected together with the bulkhead upper side frame 6 to a front end portion of the wheel house upper member 7. A front end portion of the front wheel house lower member 8 is connected via a front side gusset 9 to a front end portion of a front side frame 10 which extends in the vehicle longitudinal direction.

A bumper beam 11 which extends in the vehicle width direction is mounted on a front end portion of the front side frame 10. A rear end portion of the front side frame 10 is joined to a front end portion of a side sill S via an outrigger portion 10a. A bottom end portion of a front pillar lower stiffener 15 is joined to the front end portion of the side sill S. A bottom end portion of a front pillar upper stiffener 16 is joined to a top end portion of the front pillar lower stiffener 15, and a rear end portion of the wheel house upper member 7 is joined to this join portion. Note that 12 is a damper housing, and 13 is a dashboard upper.

A rear end portion of the front pillar upper stiffener 16 is joined to a roof side stiffener 17. A rear end portion of the roof side stiffener 17 is connected to a rear pillar stiffener 18. Note that the rear pillar stiffener 18 is connected to a rear end of the side sill S via a rear inner panel (not shown). A front end portion of a rear floor frame 20 is connected via a rear frame side reinforcement 19 to a rear end portion of the side sill S. Here, a center pillar stiffener 21 is joined between a center portion of the roof side stiffener 17 and a center portion of the side sill S.

Note that a rear floor cross member 22 is joined to a join portion between the rear frame side reinforcement 19 and the rear floor frame 20 extending in the vehicle width direction. A middle floor cross member 23 is connected to the rear end portion of the side sill S extending in the vehicle width direction, while a front floor cross member 24 is joined to the front end portion of the side sill S extending in the vehicle width direction. The rear floor cross member 22, the middle cross member 23, and the front floor cross member 24 constitute a vehicle body frame component which is aligned in the vehicle body transverse direction.

Figure 3:
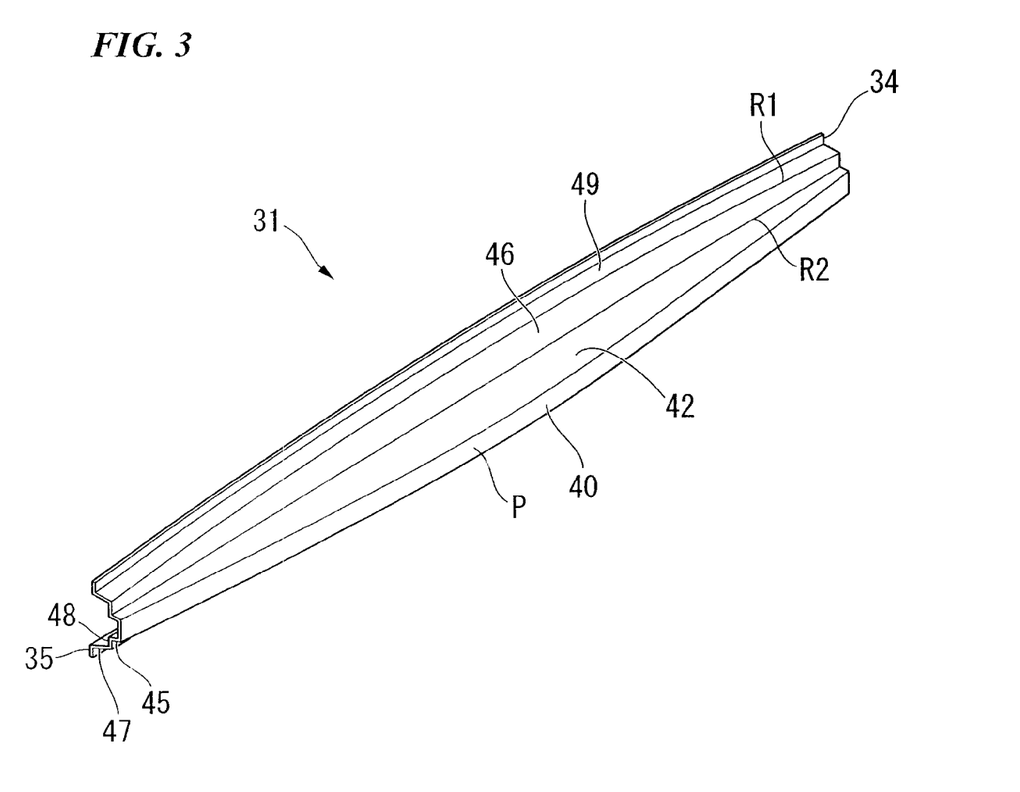
FIG. 3 is a perspective view showing a side sill reinforcement.
Figure 4:
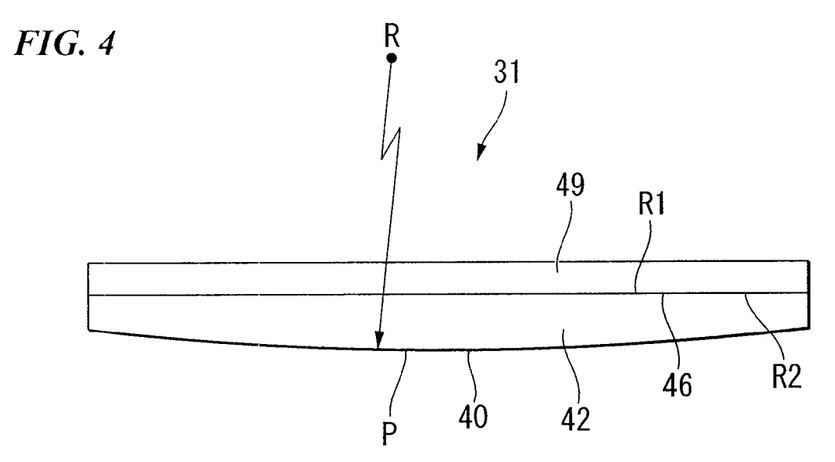
FIG. 4 is a plan view of FIG. 3.
Figure 5:
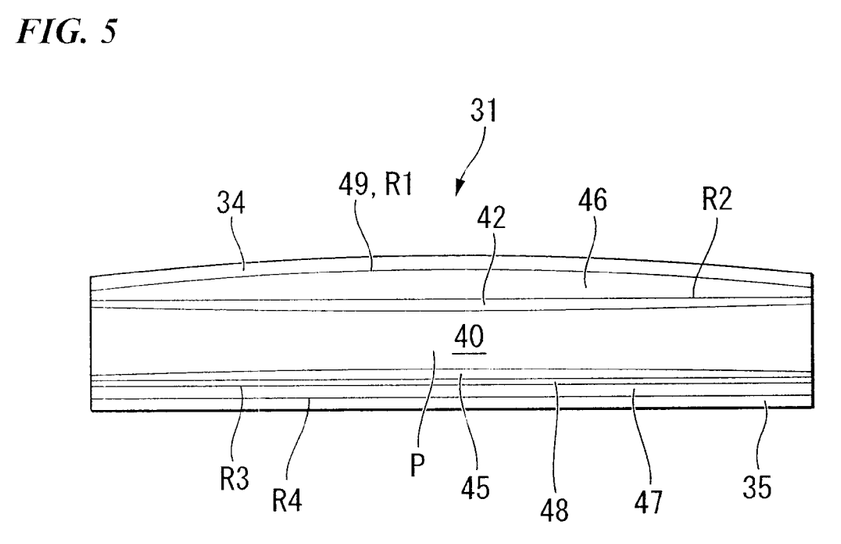
FIG. 5 is a side view of FIG. 3.
Figure 6:
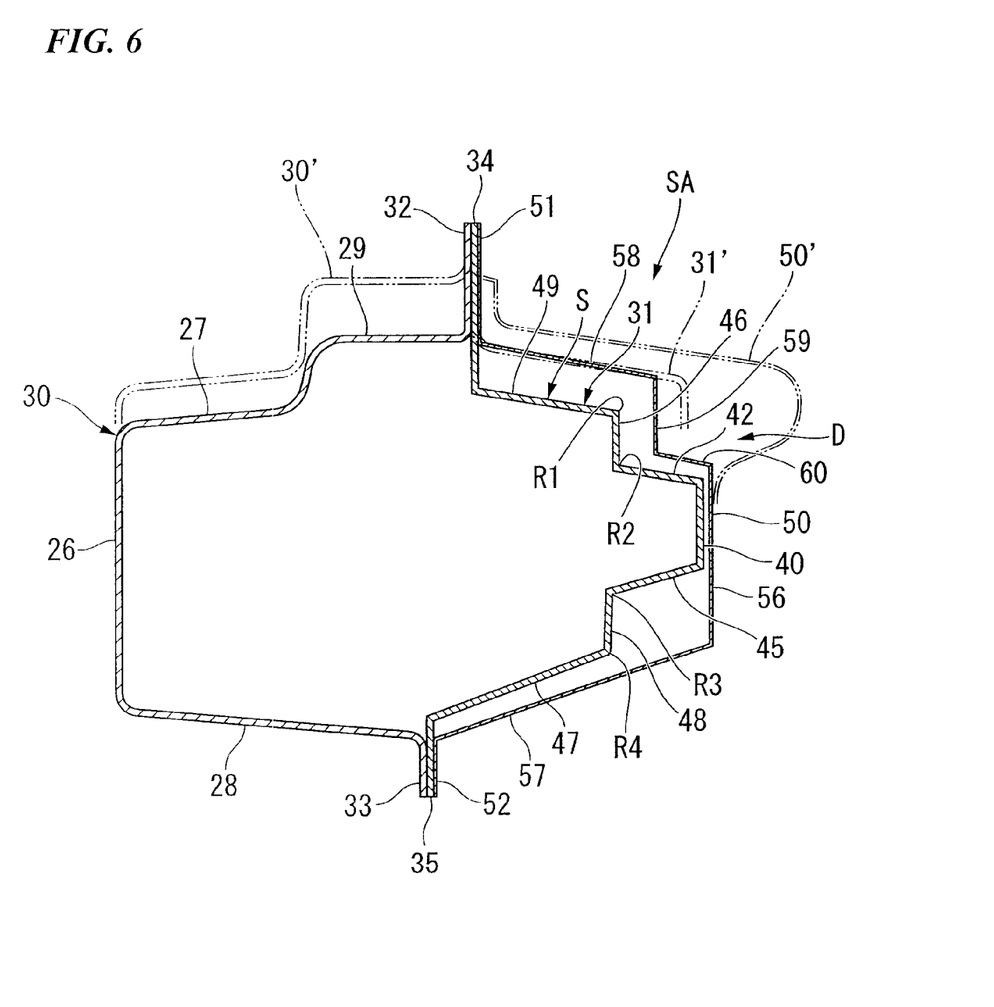
FIG. 6 is a cross-sectional view taken along a line A-A in FIG. 1.

FIG. 3 is a perspective view showing a side sill reinforcement. FIG. 4 is a plan view thereof, FIG. 5 is a side view thereof, and FIG. 6 is a cross-sectional view taken along a line A-A in FIG. 1. The side sill S is a vehicle body frame component which is provided below the vehicle body lateral side portion extending in the vehicle longitudinal direction. As is shown in FIGS. 3 through 6, the side sill S is formed having a closed cross-sectional structure formed by a side sill inner 30 on the vehicle compartment interior side, and a side sill reinforcement 31 on the vehicle compartment exterior side. The side sill inner 30 is a component which bulges on the vehicle compartment interior side, and is provided with a top edge flange portion 32 and a bottom edge flange portion 33. An inner side wall of the side sill inner 30 is provided with a planar portion 26 which extends in the vehicle longitudinal direction and is oriented towards the vehicle compartment interior side. An upside flat surface 27 and an underside flat surface 28 which both extend in the vehicle longitudinal direction are formed above and below the planar portion 26. In addition, an upside flat surface 29 is formed via a step portion on a top portion of the upside flat surface 27. Note that in FIG. 6, the center pillar stiffener 21 is omitted from the drawings, and a side sill outer 50 (described below) has been added to the drawings.

The side sill reinforcement 31 is shaped so as to bulge towards the vehicle compartment exterior side, and is provided with a top edge flange portion 34 and a bottom edge flange portion 35. A closed cross-section structural portion obtained by welding together the top edge flange portion 32 of the side sill inner 30 and the top edge flange portion 34 of the side sill reinforcement 31, and by welding together the bottom edge flange portion 33 of the side sill inner 30 and the bottom edge flange portion 35 of the side sill reinforcement 31. A base portion of the top edge flange portion 34 of the side sill reinforcement 31 is positioned lower than the base portion of the top edge flange portion 32 of the side sill inner 30, while the base portion of the bottom edge flange portion 35 of the side sill reinforcement 31 is positioned higher than the base portion of the bottom edge flange portion 33 of the side sill inner 30.

As is shown in FIG. 3, a first curved surface portion 40 which is curved in an arch shape whose center portion bulges towards the exterior side of the vehicle compartment and faces the vehicle body lateral side portion is formed in an exterior side wall of the side sill reinforcement 31 at a radius of curvature R (see FIG. 4) such that the vicinity of a join position with the center pillar stiffener 21 forms an apex point P. A second upside flat portion 42 which extends diagonally upwards towards the vehicle compartment interior side is formed on a top edge of the first curved surface portion 40, while a third underside flat portion 45 which extends diagonally downwards towards the vehicle compartment interior side is formed on a bottom edge of the first curved surface portion 40.

The second upside flat portion 42 extends from a bottom edge of a vertical wall portion 46, while a top edge of a vertical wall portion 48 continues from a bottom edge of the third underside flat portion 45. The vertical wall portion 48 extends to the bottom edge flange portion 35 via a fourth underside flat portion 47 which stretches diagonally downwards towards the vehicle compartment interior side.

Here, an arch-shaped second curved surface portion 49 whose center portion bulges upwards is formed between a top edge of the vertical wall portion 46 and the top edge flange portion 34.

Because the second curved surface portion 49 is formed in an arch shape, the top edge flange portion 34 is also formed in an upwardly curving arch shape. Moreover, a first ridge line R1 which is formed by the second curved surface portion 49 and the vertical wall portion 46 is also formed in an upwardly curving arch shape. A second ridge line R2 which is formed by the first upside flat portion 42 and the vertical wall portion 46 is a rectilinear portion. In the same way, a third ridge line R3 which is formed by the third underside flat portion 45 and the vertical wall portion 48, and a fourth ridge line R4 which is formed by the fourth underside flat portion 47 and the vertical wall portion 48 are also rectilinear portions.

Here, a front end and a rear end of the first curved surface portion 40 are in the vicinity of the vertical wall portions 46 and 48 in the vehicle width direction. The first curved surface portion 40 is formed so as to bulge towards the vehicle compartment exterior side from the front and rear ends. Moreover, a front end and a rear end of the second curved surface portion 49 are in the vicinity of the second upside flat portion 42 in a vertical direction. The second curved surface portion 49 is formed so as to bulge upwards from the front and rear ends. Accordingly, front and rear end portions of the side sill reinforcement 31 have a smaller cross section in the vehicle width direction and vertical direction than is the case conventionally. Moreover, the side sill inner 30 which is joined to the side sill reinforcement 31 also has a smaller cross section compared with a conventional case. As a result, front and rear ends of the side sill S can be formed having a smaller cross section.

A side sill outer 50 which covers the side sill reinforcement 31 as an outer plate component, and is also joined to an outer surface of the side sill S, specifically, to the first curved surface portion 40 so as to constitute a side sill assembly SA is mounted on an outer side of the side sill reinforcement 31. The side sill outer 50 is joined to both the top edge flange portion 34 and the bottom edge flange portion 35 of the side sill reinforcement 31, and is provided with a top edge flange portion 51 and a bottom edge flange portion 52. Note that in the present embodiment, a description is given of a side sill outer 50 which is formed as a single component, however, the present invention can also be applied in cases in which a side sill outer portion is provided so as to form a portion of a side panel outer which makes up a vehicle body outer side wall.

An outer side wall of the side sill outer 50 is joined by adhesion or welding to the first curved surface portion 40 of the side sill reinforcement 31. Furthermore, the outer side wall of the side sill outer 50 is provided with a flat portion 56 which faces to the side, and with a bottom portion flat portion 57 which extends as far as the bottom edge flange portion 52. The flat portion 56 and the bottom portion flat portion 57 cover from the first curved surface portion 40 to the vertical wall portion 48. A first curved surface portion 58 which covers the second curved surface portion 49 of the side sill reinforcement 31, a flat portion 59 which covers the vertical wall portion 46, and a second flat portion 60 which covers the second upside flat portion 42 are provided on a top portion of the flat portion 56.

Accordingly, in front and rear portions of the side sill S, when the side sill outer 50 is joined thereto, a portion formed by the flat portion 59 of the side sill outer 50 and by the second flat portion 60 functions as a step portion D which prevents any interference to the movement trajectory of a vehicle occupant's legs when the occupant is getting into or out of either the front seat or the rear seat of a vehicle. In particular, in conjunction with the fact that, as is described above, the cross-sectional area of the front and rear end portions of the side sill S is smaller than is the case conventionally, it is possible to secure a more inward and downward movement trajectory for the legs of a vehicle occupant when the occupant is getting into or out of a vehicle.

According to the above described first embodiment, in a front-on vehicle collision, particularly in an offset collision, if an impact load towards the rear is applied to the front side frame 10 on the left side, or if an impact load towards the front is applied from the rear floor frame 20, then the load acts as a load which compresses the side sill S in the longitudinal direction. The side sill S has a closed cross-sectional structure, and the vertical wall portions 46 and 48, the fourth underside flat portion 47, the second upside flat portion 42, and the third underside flat portion 45 which are formed flat and extend in the longitudinal direction are formed in the side sill reinforcement 31. Moreover, the planar portion 26, the top portion flat surfaces 27 and 29, and the underside flat surface 28 together with the second ridge line R2, the third ridge line R3, and the fourth ridge line R4 which are rectilinear portions are formed in the side sill inner 30. As a result, it is possible to provide sufficient resistance to a load applied in the vehicle longitudinal direction.

Moreover, since the side sill outer 50 and the first curved surface portion 40 are joined, and the side sill outer 50 is linked to an outer plate component, it is also possible for the load to be dispersed to the outer plate component as well.

Furthermore, the second curved surface portion 49 which is formed in the side sill reinforcement 31 receives force which causes it to bend upwards, and the force can also be dispersed to the center pillar stiffener 21 as well.

Moreover, in a side-on vehicle collision, if an impact load is applied from the vehicle body side to the vicinity of the mounting position of the center pillar stiffener 21, then the first curved surface portion 40 of the arch-shaped side sill reinforcement 31 receives the impact load. The impact load is applied from the front end portion of the side sill reinforcement 31 towards the outrigger portion 10a of the front side frame 10, or from the rear end portion to the rear floor frame 20 via the rear frame side reinforcement 19. Namely, since it is possible for the entire side sill S, the front side frame 10, and the rear floor frame 20 to receive a load, it is possible to prevent bending deformation.

Accordingly, without it being necessary to provide a separate component, and without there being any increase in the vehicle body weight, it is possible for the side sill S to be made to function effectively as a framework component even in a side-on collision, and for the input load to be received by the entire vehicle body. As a result, compared with when a separate component is used, it is possible to reduce the vehicle weight. Therefore, an improvement in fuel consumption can be achieved.

Moreover, since it is possible to reduce the dispersed load which acts on vehicle body framework components which have been arranged in the vehicle width direction such as the rear floor cross member 22, the middle floor cross member 23, and the front floor cross member 24, a reduction in the weight of the components can also be achieved.

In addition, the side sill outer 50 which is placed on the outer side of the side sill reinforcement 31 is joined to the side sill inner 30 and the side sill reinforcement 31, and the flat portion 59 and the second flat portion 60 which conform to the vertical wall portion 46 and the second upside flat portion 42 of the side sill reinforcement 31 are provided in the side sill outer 50. Because of this, in the front end portion and rear end portion of the side sill S, the step portion D which is formed by the flat portion 59 and the second flat portion 60 of the side sill outer 50 secures excellent legroom when a vehicle occupant is getting into or out of a vehicle, and can function as a run-off which does not obstruct the leg movement trajectory. Accordingly, rear seat occupants and front seat occupants are able to get into or out of a vehicle easily, resulting in improved ease of vehicle entering and exiting.

Namely, in contrast to a conventional side sill outer 50' in which the corner portion protrudes considerably outwards, as is shown by the chain line on the right side in FIG. 6, there is a marked improvement in ease of vehicle entering and exiting in the present embodiment in which the portion is formed by the step portion D which is set back diagonally downwards a considerable distance.

Furthermore, in the present embodiment, compared with the positions of the conventional side sill outer 50', side sill inner 30', and side sill reinforcement 31' which are shown by the chain lines in FIG. 6, the side sill outer 50 and the side sill inner 30 can be lowered by the same amount that the cross-sectional area of both end portions of the side sill S, namely, the side sill assembly SA is reduced. As a result, it is possible to improve the ease of vehicle entry and exit for both front seat occupants and rear seat occupants.

Note that the present invention is not limited to the above described first embodiment. For example, in the above described first embodiment, the first curved surface portion 40 and the second curved surface portion 49 are formed in the side sill reinforcement 31, however, it is also possible to employ a structure in which the side sill outer 50 is formed at the same plate thickness as the side sill inner 30, and the first curved surface portion 40 and the second curved surface portion 49 are provided in the side sill outer 50.

Moreover, it is also possible for the upside flat surface 27 and the underside planar surface 29 which form the top wall of the side sill inner 30 to be formed as upwardly bulging curved surfaces.

Next, a second embodiment of the present invention will now be described with reference to the drawings.

Figure 7:
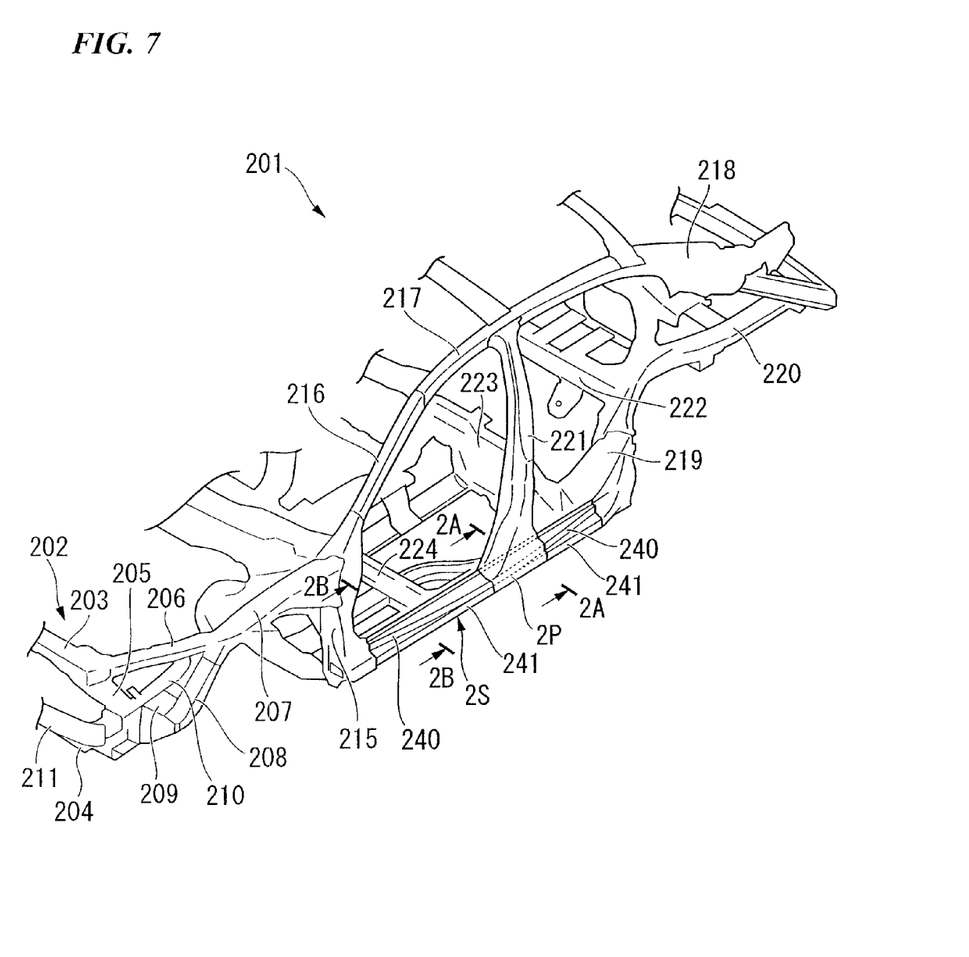
FIG. 7 is a perspective view showing a left side of a vehicle body according to a second embodiment of the present invention.
Figure 8:
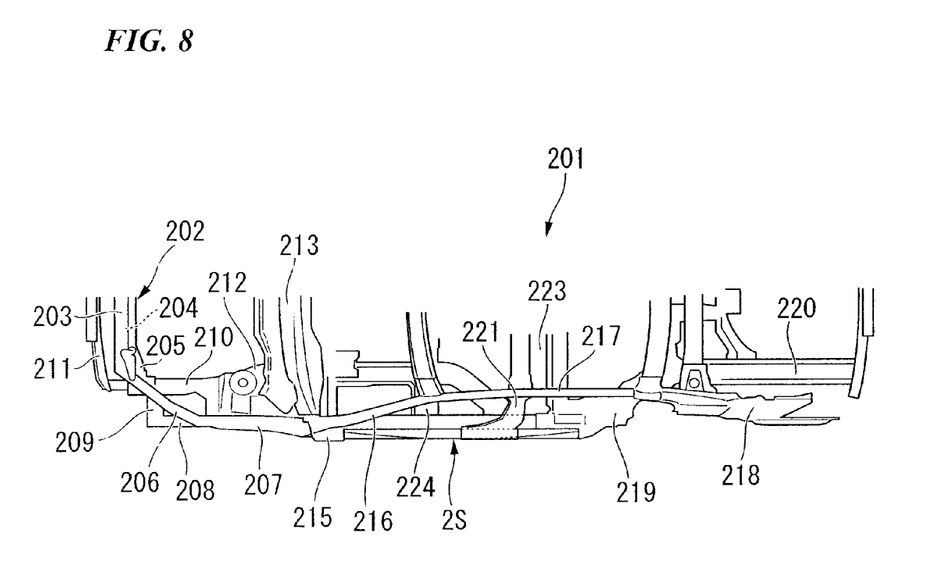
FIG. 8 is a plan view of FIG. 7.

FIG. 7 is a perspective view showing a left side of a vehicle body 201, while FIG. 8 is a plan view thereof.

In FIGS. 7 and 8, a frame-shaped front bulkhead 202 which protects a radiator (not shown) is provided in a vehicle body front portion. The front bulkhead 202 is formed by joining together a bulkhead upper center frame 203 which makes up a top side of the front bulkhead 202, a bulkhead lower cross member 204 which makes up a bottom side of the front bulkhead 202 and whose two end portions extend upwards, and bulkhead side stays 205 and 205.

A front end portion of a bulkhead upper side frame 206 is connected to both end portions of the bulkhead upper center frame 203, and a rear end portion of the bulkhead upper side frame 206 is connected to a wheel house upper member 207. A rear end portion of a front wheel house lower member 208 is connected together with the bulkhead upper side frame 206 to a front end portion of the wheel house upper member 207. A front end portion of the front wheel house lower member 208 is connected via a front side gusset 209 to a front end portion of a front side frame 210 which extends in the vehicle longitudinal direction.

A bumper beam 211 which extends in the vehicle width direction is mounted on a front end portion of the front side frame 210. A rear end portion of the front side frame 210 is joined to a front end portion of a side sill 2S. A bottom end portion of a front pillar lower stiffener 215 is joined to the front end portion of the side sill 2S. A bottom end portion of a front pillar upper stiffener 216 is joined to a top end portion of the front pillar lower stiffener 215, and a rear end portion of the wheel house upper member 207 is joined to the joint portion. Note that 212 is a damper housing, and 213 is a dashboard upper.

A rear end portion of the front pillar upper stiffener 216 is joined to a roof side stiffener 217. A rear end portion of the roof side stiffener 217 is connected to a rear pillar stiffener 218. Note that the rear pillar stiffener 218 is connected to a rear end of the side sill 2S via a rear inner panel (not shown). A front end portion of a rear floor frame 220 is connected via a rear frame side reinforcement 219 to a rear end portion of the side sill 2S. Here, a center pillar stiffener 221 is joined between a center portion of the roof side stiffener 217 and a center portion of the side sill 2S.

Note that a rear floor cross member 222 is joined to a join portion between the rear frame side reinforcement 219 and the rear floor frame 220 extending in the vehicle width direction. A middle floor cross member 223 is connected to the rear end portion of the side sill 2S extending in the vehicle width direction, while a front floor cross member 224 is joined to the front end portion of the side sill 2S extending in the vehicle width direction. The rear floor cross member 222, the middle cross member 223, and the front floor cross member 224 constitute a vehicle body frame component which is aligned in the vehicle body transverse direction.

Figure 9:
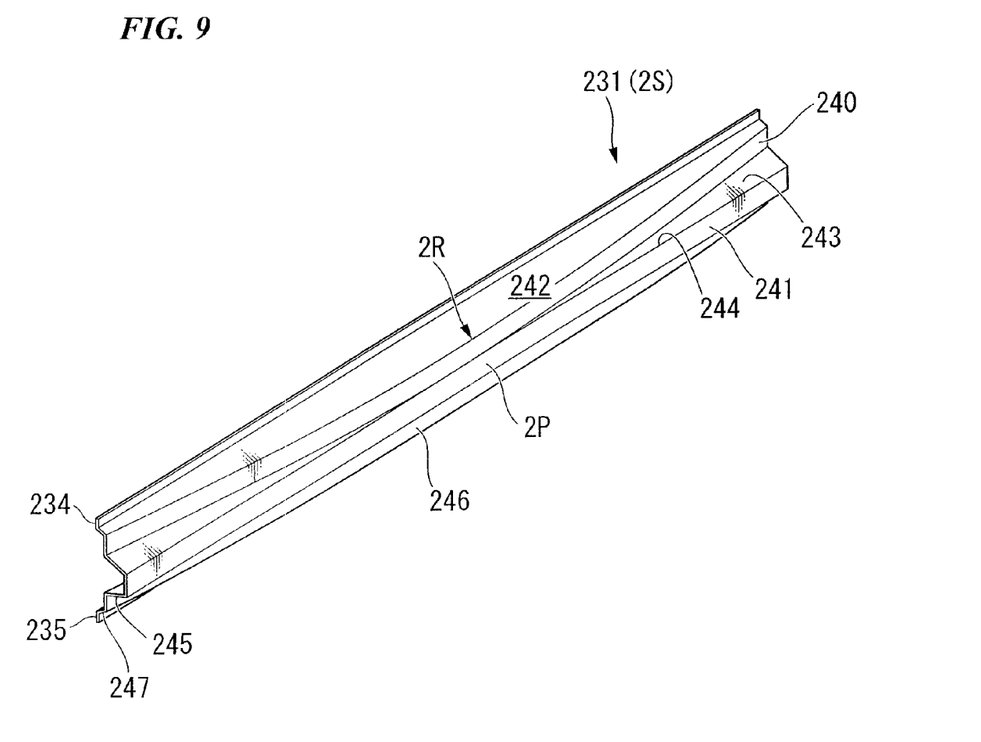
FIG. 9 is a perspective view showing a side sill reinforcement.
Figure 10:
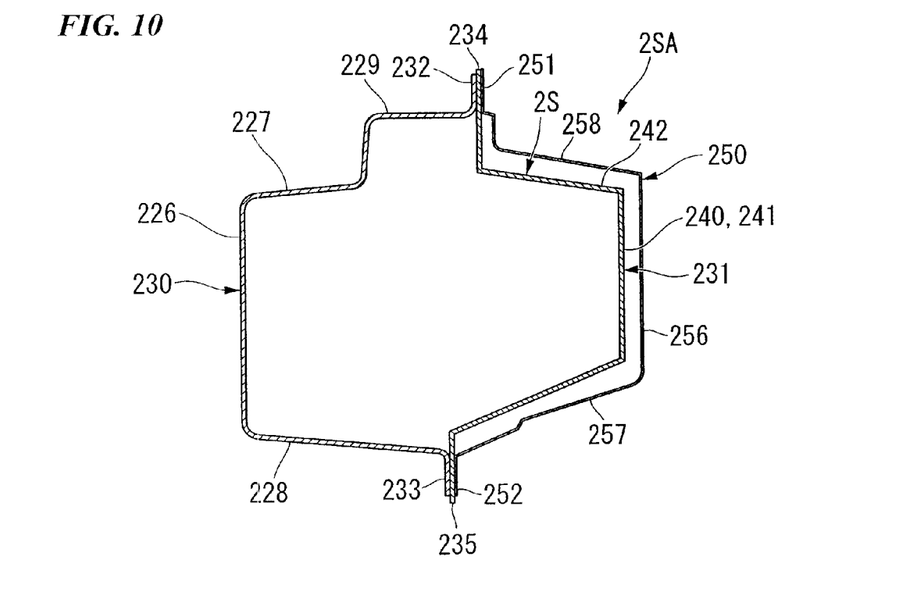
FIG. 10 is a cross-sectional view taken along a line 2A-2A in FIG. 7.
Figure 11:
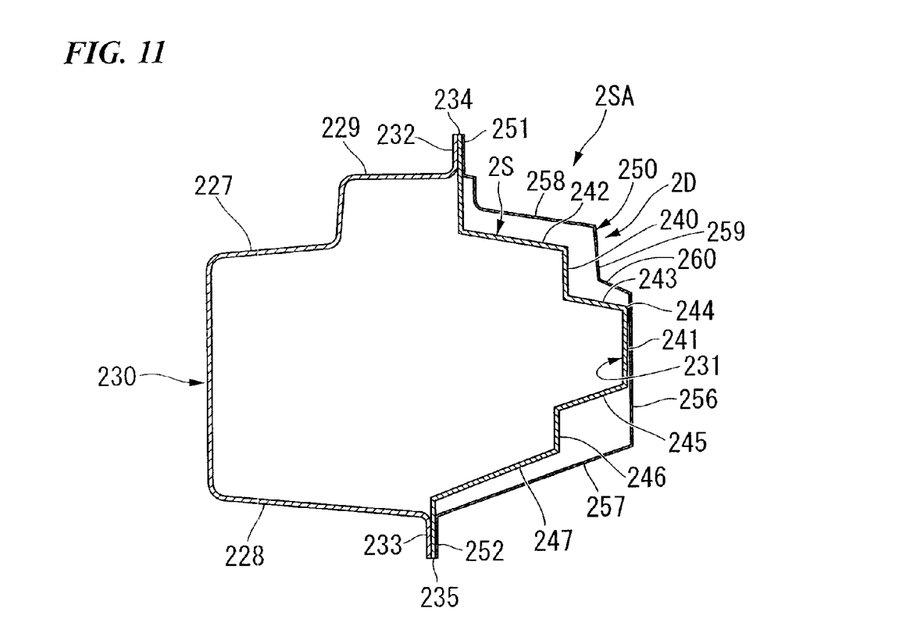
FIG. 11 is a cross-sectional view taken along a line 2B-2B in FIG. 7.

The side sill 2S is a vehicle body frame component which is provided below the vehicle body lateral side portion extending in the vehicle longitudinal direction. As is shown in FIGS. 9 through 11, the side sill 2S is a vehicle body frame component which is formed having a closed cross-sectional structure formed by a side sill inner 230 on the vehicle compartment interior side, and a side sill reinforcement 231 on the vehicle compartment exterior side. The side sill inner 230 is a component which bulges on the vehicle compartment interior side, and is provided with a top edge flange portion 232 and a bottom edge flange portion 233. An inner side wall of the side sill inner 230 is provided with a planar portion 226 which extends in the vehicle longitudinal direction and is oriented towards the vehicle compartment interior side. An upside flat surface 227 and an underside flat portion surface 228 which both extend in the vehicle longitudinal direction are formed above and below the planar portion 226. In addition, an upside flat surface 229 is formed via a step portion on a top portion of the upside flat surface 227. Note that in FIG. 10, the center pillar stiffener 221 is omitted from the drawings, and a side sill outer 250 (described below) has been added to the drawings.

The side sill reinforcement 231 is shaped so as to bulge towards the vehicle compartment exterior side, and is provided with a top edge flange portion 234 and a bottom edge flange portion 235. A closed cross-sectional structure portion obtained by welding together the top edge flange portion 232 of the side sill inner 230 and the top edge flange portion 234 of the side sill reinforcement 231, and by welding together the bottom edge flange portion 233 of the side sill inner 230 and the bottom edge flange portion 235 of the side sill reinforcement 231. A base portion of the top edge flange portion 234 of the side sill reinforcement 231 is positioned lower than the base portion of the top edge flange portion 232 of the side sill inner 230, while the base portion of the bottom edge flange portion 235 of the side sill reinforcement 231 is positioned higher than the base portion of the bottom edge flange portion 233 of the side sill inner 230.

As is shown in FIG. 9, a curved surface portion 240 which is curved in an arch shape whose front and rear portions bulge towards the interior side of the vehicle compartment and faces the vehicle body lateral side portion is formed in a top portion of an exterior side wall of the side sill reinforcement 231 at a radius of curvature 2R such that the vicinity of a join position with the center pillar stiffener 221 forms an apex point 2P. A planar portion 241 which is oriented towards the vehicle body side and faces towards the vehicle longitudinal direction is formed below the curved surface portion 240.

Accordingly, a first upside flat portion 242 which extends diagonally downwards from a bottom side of the base portion of the top edge flange portion 234 and continues to a top portion of the curved surface portion 240 is formed. In the first upside flat portion 242, the portion thereof which is adjacent to the join portion with the center pillar stiffener 221 bulges the most to the outside, and the amount of the outward bulge decreases approaching the front end portion and the rear end portion thereof.

Moreover, a second upside flat portion 243 is formed which continues from a bottom portion of the curved surface portion 240 and extends from there diagonally downwards towards the outer side. An outer edge of the second upside flat portion 243 is continuous with the planar portion 241 via a ridge line portion 244. The second upside flat portion 243 is formed as a surface which disappears in the central portion of the side sill 2S, and which widens onto the vehicle compartment interior side approaching the front end portion and the rear end portion of the side sill 2S.

A third underside flat portion 245 which extends diagonally downwards towards the vehicle compartment interior side is formed on a bottom edge of the planar portion 241. The third underside flat portion 245 is formed so as to be continuous as far as the bottom edge flange portion 235, which is joined to a bottom edge of a fourth underside flat portion 247, via a vertical wall portion 246 which extends vertically on the vehicle body side, and via the fourth underside flat portion 247 which extends diagonally downwards towards the vehicle compartment interior side from a bottom edge of the vertical wall portion 246.

Note that the curved surface portion 240 and the planar portion 241 have outer side surfaces which are substantially the same height in the vicinity of the connection portion of the center pillar stiffener 221.

A side sill outer 250 which covers the side sill reinforcement 231 as an outer plate component, and is mounted on an outer surface of the side sill 2S so as to constitute a side sill assembly 2SA is mounted on an outer side of the side sill reinforcement 231. The side sill outer 250 is joined to both the top edge flange portion 234 and the bottom edge flange portion 235 of the side sill reinforcement 231, and is provided with a top edge flange portion 251 and a bottom edge flange portion 252.

An outer side wall of the side sill outer 250 is provided with a flat portion 256 which matches from the planar portion 241 of the side sill reinforcement 231 as far as the vertical wall portion 246 and covers the portion, and with an underside flat portion 257 which extends as far as the bottom edge flange portion 252. A first planar portion 258 which covers the first upside flat portion 242 of the side sill reinforcement 231, an arch portion 259 which matches the curved surface portion 240 and covers the portion, and a second flat portion 260 which covers the second upside flat portion 243 are provided on a top edge of the flat portion 256.

Accordingly, in the front and rear of the side sill 2S, when the side sill outer 250 is joined thereto, a portion formed by the arch portion 259 of the side sill outer 250 and by the second flat portion 260 functions as a step portion 2D which prevents any interference to the movement trajectory of a vehicle occupant's legs when the occupant is getting into or out of either the front seat or the rear seat of a vehicle.

According to the above described second embodiment, in a front-on vehicle collision, particularly in an offset collision, if an impact load towards the rear is applied to the front side frame 210 on the left side, or if an impact load towards the front is applied from the rear floor frame 220, then the load acts as a load which compresses the side sill 2S in the longitudinal direction. Since the side sill 2S has a closed cross-sectional structure, and because the planar portion 241 which is formed as a flat surface and extends in the longitudinal direction is formed in the side sill reinforcement 231, it is possible to provide sufficient resistance to a load applied in the vehicle longitudinal direction.

Moreover, in a side-on vehicle collision, if an impact load is applied from the vehicle body side to the vicinity of the mounting position of the center pillar stiffener 221, then the curved surface portion 240 of the arch-shaped side sill reinforcement 231 receives the impact load. The impact load is applied to the front end portion and rear end portion sides of the side sill reinforcement 231. Namely, since it is possible for the entire side sill 2S to receive a load, it is possible to prevent bending deformation. Moreover, since a load is transmitted from the front end portion and the rear end portion of the side sill reinforcement 231 to the front side frame 210, or to the rear floor frame 220, the load can be dispersed.

Accordingly, without it being necessary to provide a separate component, and without there being any increase in the vehicle body weight, it is possible for the side sill 2S to be made to function effectively as a framework component even in a side-on collision. As a result, compared with when a separate component is used, it is possible to reduce the vehicle weight. Therefore, an improvement in fuel consumption can be achieved.

Moreover, since it is possible to reduce the dispersed load which acts on vehicle body framework components which have been arranged in the vehicle width direction such as the rear floor cross member 222, the middle floor cross member 223, and the front floor cross member 224, a reduction in the weight of the components can also be achieved.

In addition, the side sill outer 250 which covers the side sill reinforcement 231 and forms the outer side surface of the side sill 2S is provided on the outer side of the side sill reinforcement 231, and is joined to the side sill inner 230 and the side sill reinforcement 231, and the arch portion 259 and the flat portion 256 which conform to the curved surface portion 240 and the planar portion 241 of the side sill reinforcement 231 are provided in the side sill outer 250. Because of this, in the front end portion and rear end portion of the side sill 2S, the step portion D which is formed by the arch portion 259 and the flat portion 256 of the side sill outer 250 secures excellent legroom when a vehicle occupant is getting into or out of a vehicle, and can function as a run-off which does not obstruct the leg movement trajectory. Accordingly, rear seat occupants and front seat occupants are able to get into or out of a vehicle easily, resulting in improved ease of vehicle entering and exiting.

Note that the present invention is not limited to the above described second embodiment. For example, in the above described second embodiment, the curved surface portion 240 and the planar portion 241 are formed in the side sill reinforcement 231, however, it is also possible to employ a structure in which the side sill outer 250 is formed at the same plate thickness as the side sill inner 230, and the curved surface portion 240 and the planar portion 241 are provided in the side sill outer 250.

INDUSTRIAL APPLICABILITY

It is possible to provide a vehicle body lateral side portion structure which does not require any component other than a side sill, and which is able to receive an impact load from both a vehicle front-on collision and a vehicle side-on collision over an entire vehicle body without this leading to any increase in the vehicle weight.

The invention claimed is:

1. A vehicle body lateral side portion structure, comprising:
   a side sill inner that extends in a vehicle longitudinal direction, wherein an inner side wall of the side sill inner includes an inner side wall planar portion; and
   a side sill reinforcement that is laterally exterior to the side sill inner while extending in the vehicle longitudinal direction, the side sill reinforcement being joined to the side sill inner to define a side sill that has a closed cross-sectional structure, the side sill being arranged as a vehicle body frame component that extends along the vehicle longitudinal direction, wherein the side sill includes a distal end portion that is connected to a front side frame of the vehicle body and a rear end portion that is connected to a rear frame portion of the vehicle body, and wherein
   the side sill reinforcement includes an outer side wall having a plurality of step portions and a curved surface portion that is curved over an entire length in the vehicle longitudinal direction, the curved surface portion having an apex point in the vehicle longitudinal direction, the apex point being laterally spaced from the inner side wall planar portion a distance that is greater than any other point of the curved surface portion as the curved surface portion extends between a front end and a rear end of said side sill, the apex point being in a vicinity of a join position with a center pillar of the vehicle body.

2. The vehicle body lateral side portion structure according to claim 1, further comprising a side sill outer which is joined to the side sill inner and the side sill reinforcement so that the side sill reinforcement is laterally between the side sill outer and the side sill inner so as to cover the side sill reinforcement, wherein
   the side sill outer is provided with an arch portion and a flat portion which conform respectively to the curved surface portion and a planar portion of the side sill reinforcement.

3. The vehicle body lateral side portion structure according to claim 1, wherein
   a center portion of a planar portion of the side sill reinforcement is formed in an arch shape which bulges upwards and the planar portion of the side sill reinforcement extends in the vehicle longitudinal direction.

4. The vehicle body lateral side portion structure according to claim 1, wherein:
   the curved surface is formed in a center portion of the outer side wall of the side sill reinforcement; and
   a planar portion of the side sill reinforcement is formed adjacent to a top of the curved surface and the planar portion of the side sill reinforcement extends in the vehicle longitudinal direction.

5. The vehicle body lateral side portion structure according to claim 1, wherein:

the curved surface is formed in a top portion of the outer side wall of the side sill reinforcement; and a planar portion of the side sill reinforcement is formed below the curved surface and the planar portion of the side sill reinforcement extends in the vehicle longitudinal direction.

6. The vehicle body lateral side portion structure according to claim 1, wherein a second upside flat portion is formed that continues from a bottom portion of the curved surface portion and diagonally extends from the bottom portion downwards towards the outer side wall, and wherein an outer edge of the second upside flat portion is continuous with the planar portion via a ridge line portion.

7. The vehicle body lateral side portion structure according to claim 1, wherein the curved surface portion and the planar portion have outer side surfaces that are substantially a same height in a vicinity of a connection portion of the center pillar.

* * * * *